United States Patent
Chio

(10) Patent No.: US 7,119,465 B2
(45) Date of Patent: Oct. 10, 2006

(54) MAGNETIC SUSPENSION BEARING

(76) Inventor: Chun-Nan Chio, 4F-2, No. 333, Fu-Hsing N. Rd., Taipei City (TW)

( * ) Notice: Subject to any disclaimer, the term of this patent is extended or adjusted under 35 U.S.C. 154(b) by 0 days.

(21) Appl. No.: 10/959,983

(22) Filed: Oct. 8, 2004

(65) Prior Publication Data

US 2006/0079253 A1 Apr. 13, 2006

(51) Int. Cl.
*H02K 7/09* (2006.01)
*F16C 39/06* (2006.01)

(52) U.S. Cl. ................................... 310/90.5
(58) Field of Classification Search .............. 310/90.5, 310/91, 90
See application file for complete search history.

(56) References Cited

U.S. PATENT DOCUMENTS

| 3,958,842 | A | * | 5/1976 | Telle | 310/90.5 |
| 4,072,370 | A | * | 2/1978 | Wasson | 310/90.5 |
| 4,379,598 | A | * | 4/1983 | Goldowsky | 310/90.5 |
| 4,988,906 | A | * | 1/1991 | Littlefield | 310/90.5 |
| 5,059,092 | A | * | 10/1991 | Kabelitz et al. | 415/90 |
| 6,688,861 | B1 | * | 2/2004 | Wampler | 417/423.7 |
| 6,770,995 | B1 | * | 8/2004 | Foshage | 310/90.5 |

FOREIGN PATENT DOCUMENTS

| JP | 404073419 | * | 3/1992 | 384/446 |

\* cited by examiner

*Primary Examiner*—Tran Nguyen

(57) ABSTRACT

A magnetic suspension bearing includes a plurality of magnets enclosed in an outer and an inner enclosure respectively. These magnets are disposed staggeringly up and down remaining a gap between each pair of magnets so as to generate a magnetic suspension force produced form repulsion force between magnets of the same polarity. With this magnetic suspension bearing the shaft is able to rotate with high speed yet less generation of heat loss by friction to improve the durability of the bearing compared with a conventional pivot or ball baring.

3 Claims, 6 Drawing Sheets

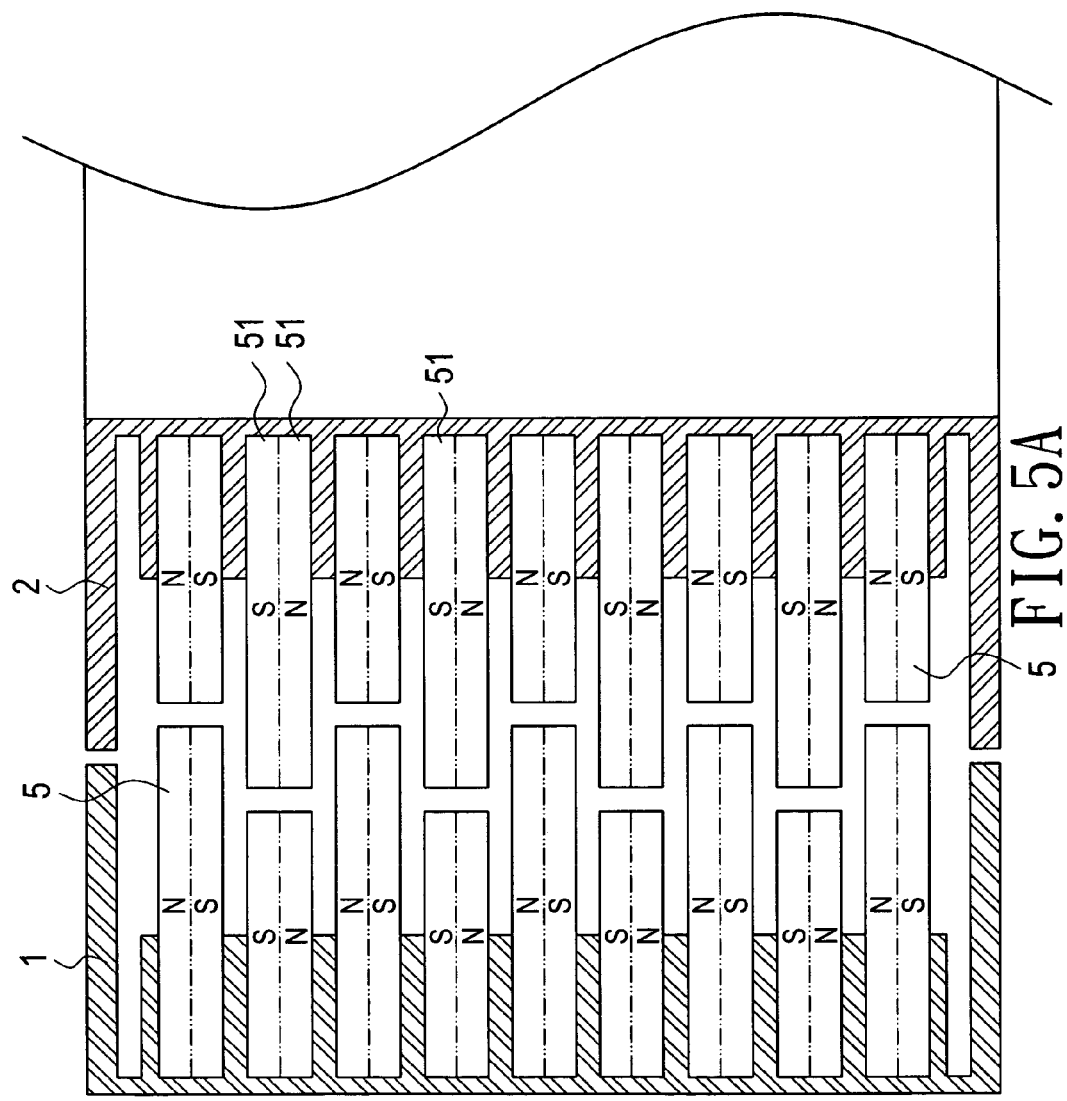

MAGNETIC SUSPENSION BEARING

BACKGROUND OF THE INVENTION

1. Field of the Invention

The present invention relates to a magnetic suspension bearing, and more particularly, to a bearing interposed between an inner and an outer enclosures both including a plurality of magnets to suspend a rotating shaft in a bearing of magnetic field formed by these magnets thereby eliminating the mechanical friction and overheating of the shaft and bearing.

2. Description of the Prior Art

In a conventional ball or pivot bearing, the mechanical friction between the rotating shaft and bearing and the heat generated therefrom are causes of noise and shortening the lifetime of the bearing. Besides, the mechanical powdered dust produced by the friction is apt to stick to the other parts of the equipment and degenerate its function.

For reducing the friction loss between the shaft and bearing, the lubricant oil is normally used. However, the lubricant oil deteriorates and become dirty to contaminate the surroundings.

The inventor has put forth every effort by continuous research and experimentation attempting the find out the remedy to palliate the inherent shortcomings of the conventional techniques described above, and at last has succeeded in realizing the present invention.

SUMMARY OF THE INVENTION

Accordingly, the present invention is to provide a magnetic suspension bearing in which a plurality of magnets are disposed staggeringly up and down in both outer and inner enclosures, and a gap is remained between each pair of magnets, so as to generate a magnetic suspension force by means of repelling force between magnets of the same polarity.

Another object of the present invention is to provide a magnetic suspension bearing in which a gap is formed between the inner and outer enclosures so as to protect the magnets from colliding one another when the shaft carries a heavy load.

Furthermore, the present invention is to provide a magnetic suspension bearing on which the shaft is able to rotate with high speed yet less generation of heat by friction to improve the durability of the bearing so it is able to work better than a conventional ball or pivot bearing.

The magnetic suspension bearing of the present invention is composed of a magnetic conducting outer enclosure enclosing a plurality of magnets; a magnetic conduction inner enclosure enclosing a plurality of magnets; a magnetic shielding outer lid provided on one side of the outer enclosure for covering the outer enclosure to isolate magnetism; and a magnetic shielding inner lid provided on one side of the inner enclosure for covering the inner enclosure to isolate magnetism. With this structure, a bearing is interposed between the inner and outer enclosure with the magnets of the two enclosures stacked up and down staggeringly remaining a gap between each facing pair of magnets. A magnetic suspension force is generated by a repelling force between the magnets of the same polarity. The shaft rotating in the magnetic suspension bearing generates less heat to improve the durability of the bearing since there is no friction loss between the shaft and bearing. The gaps remained between the inner and outer enclosures at two sides contributing to protecting the magnets from colliding one another due to strong vibration incurred by the rotating shaft carrying a heavy load. The magnetic shielding inner and outer lids contribute to functioning as isolators for magnetic leakage from the enclosures thereby protecting the structure of the present invention from being magnetized.

BRIEF DESCRIPTION OF THE DRAWINGS

The drawings disclose illustrative embodiments of the present invention which serve to exemplify the various advantages and objects hereof, and are as follows:

FIG. 5A is a cross sectional view in one more embodiment of the present invention.

DETAILED DESCRIPTION OF THE PREFERRED EMBODIMENT

Figure 1:
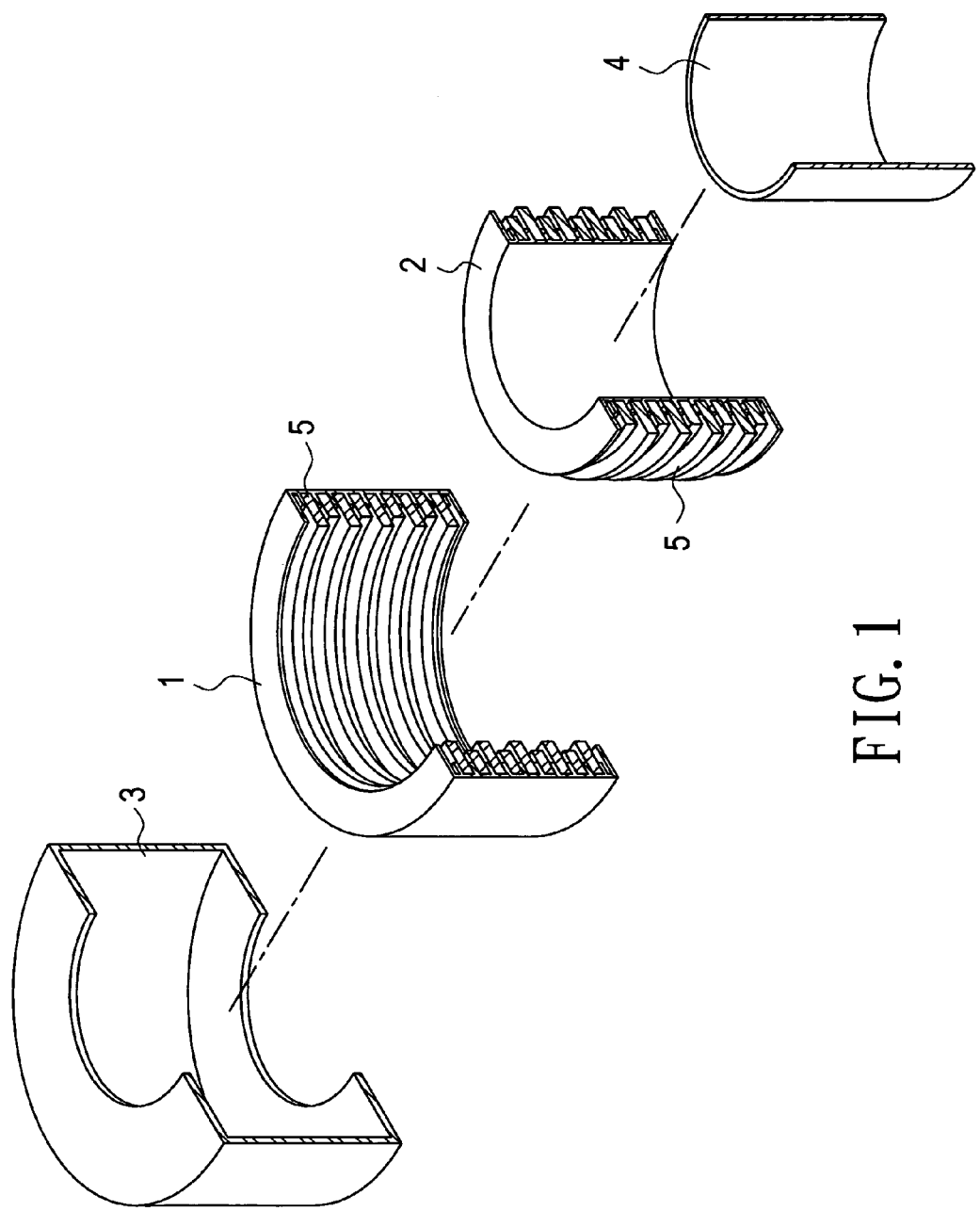
FIG. 1 is an exploded illustrative view of the present invention.
Figure 2:
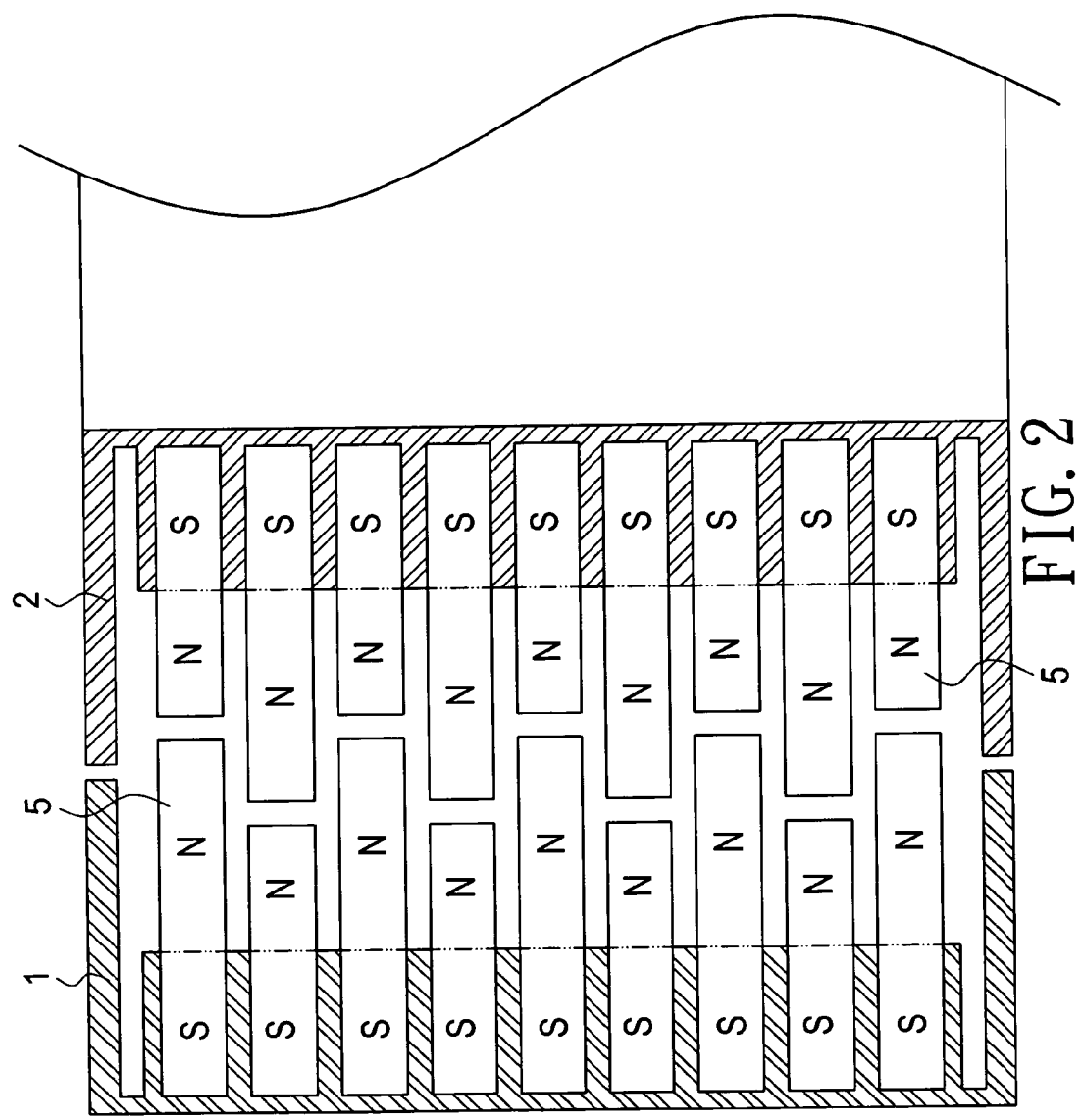
FIG. 2 is a cross sectional view of the present invention.
Figure 3:
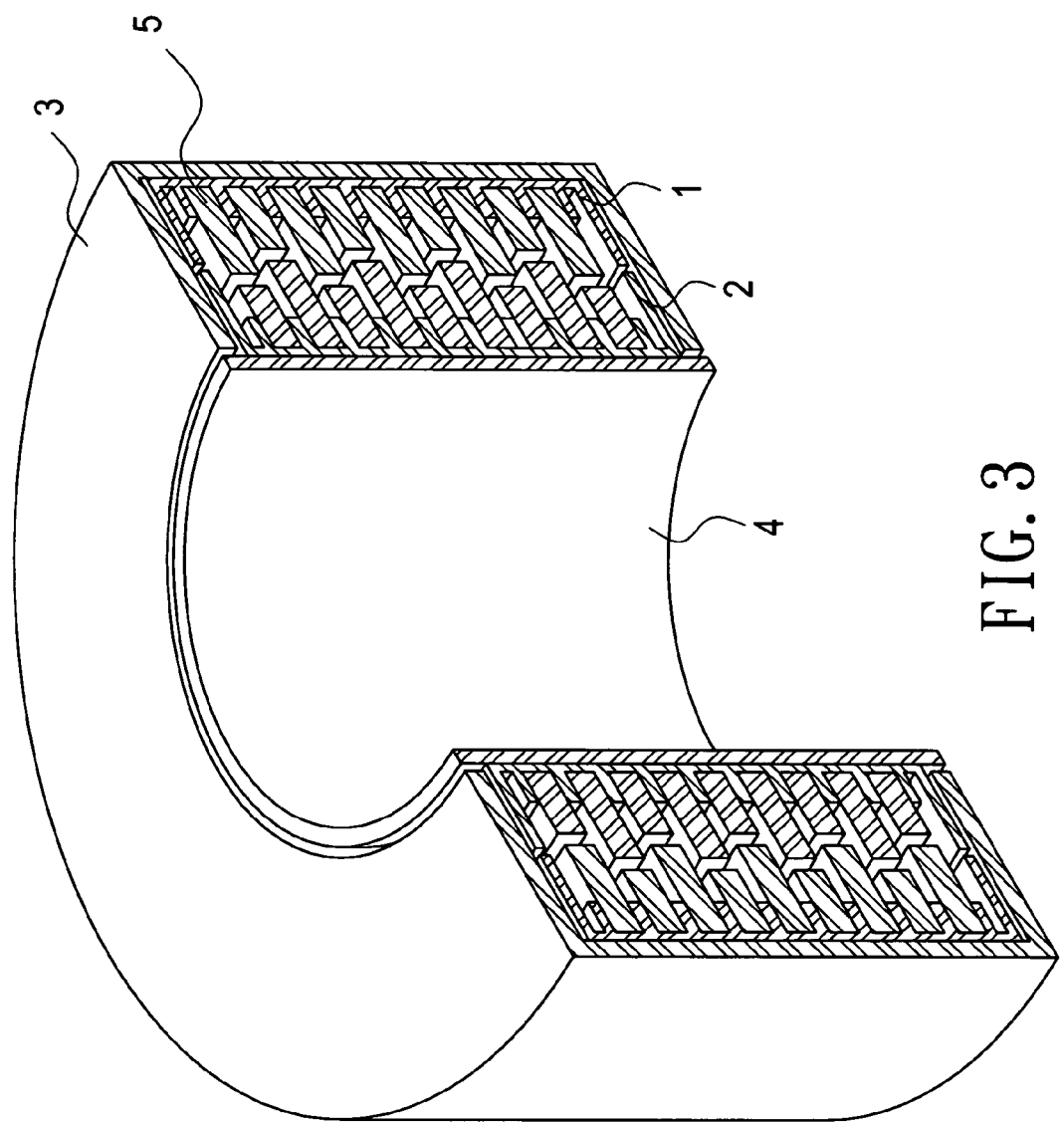
FIG. 3 is an illustrative view showing the assembled inner part of the present invention.
Figure 4:
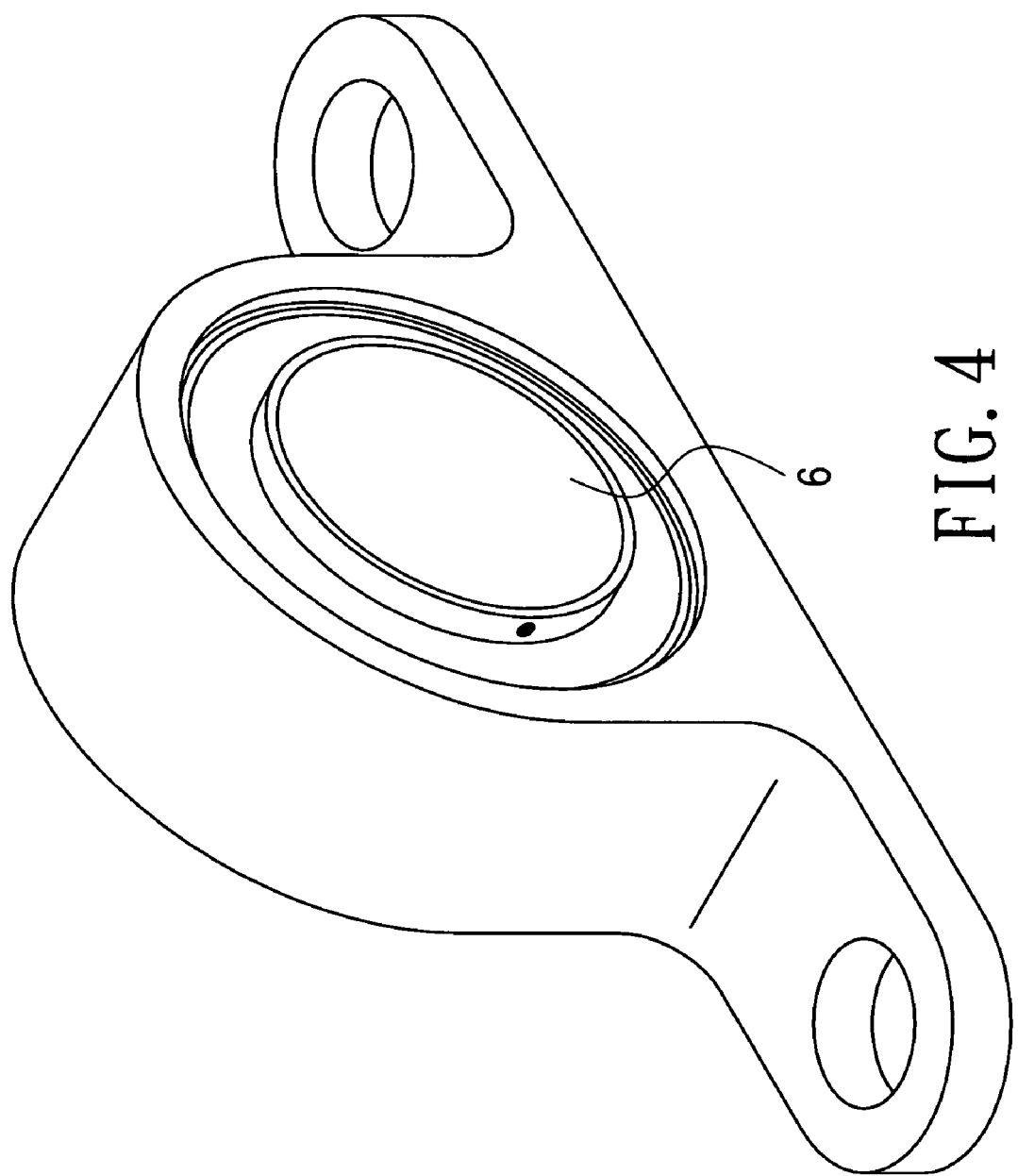
FIG. 4 is a perspective view of the present invention.

Hereinafter, the preferred embodiments of the present invention will be described detailedly with reference to the accompanied drawings.

Referring to FIG. 1 through FIG. 4, the magnetic suspension bearing of the present invention comprises a magnetic conducting outer enclosure 1 enclosing a plurality of magnets 5, where the S poles of the magnets 5 are completely enclosed but the N poles are emerged out of the enclosure 1 (the position of N and s poles can be changed); a magnetic conducting inner enclosure 2 enclosing a plurality of magnets 5, where the 5 poles of the magnets 5 are completely enclosed while the N poles are emerged out of the enclosure 2 (the position of N and S poles can be changed); a magnetic shielding outer lid 3 provided on one side of the outer enclosure 1 for covering the outer enclosure 1 to isolate the magnetism; and prevent the other parts of the mechanism from being magnetized; and a magnetic shielding inner lid 4 provided on one side of the inner enclosure 2 for covering the inner enclosure 2 to isolate the magnetism thereby preventing the rotating shaft from being magnetized.

With this structure, a bearing is interposed between the two coupled enclosures 1 and 2 with their magnets 5 stacked up and down staggeringly, e.g. when the N pole of magnets 5 in the inner enclosure 2 is stretching longer, that in the outer enclosure 1 is shorter, and vice versa. In this manner a gap is remained between each facing pair of magnets 5, and a magnetic suspension force is generated by a repelling force between magnets of the same polarity. The magnets 5 of inner and outer enclosures 2 and 1 will not contact with each other so that the shaft 6 is kept rotating in the magnetic field in a suspended state free from generating a mechanical frictional loss and hear or producing metallic powdered dust thereby prolonging the lifetime of the bearing and other parts of the mechanism as well.

Referring again to FIG. 2, a gap is remained on the upper and lower boundary of the coupled enclosures 1 and 2 respectively, these two gaps are smaller in size than those gaps remained between the magnets 5 such that when the shaft 6 rotates with a heavy load, the inner enclosure 2 is squeezed to displace towards the outer enclosure 1 and close the gaps thereof so as to prevent the mutual collision of the magnets 5 of the inner and outer enclosers 2 and 1 thereby assuring the security of the mechanism.

Meanwhile, the magnetic shielding outer and inner lids 3, 5 may serve to isolate the leakage of magnetic flux of magnets 5 both in the inner and outer enclosures 2 and 1 so as to protect the shaft 6, bearing and other parts of the mechanism from degrading the mechanical properties due to magnetization.

Figure 5:
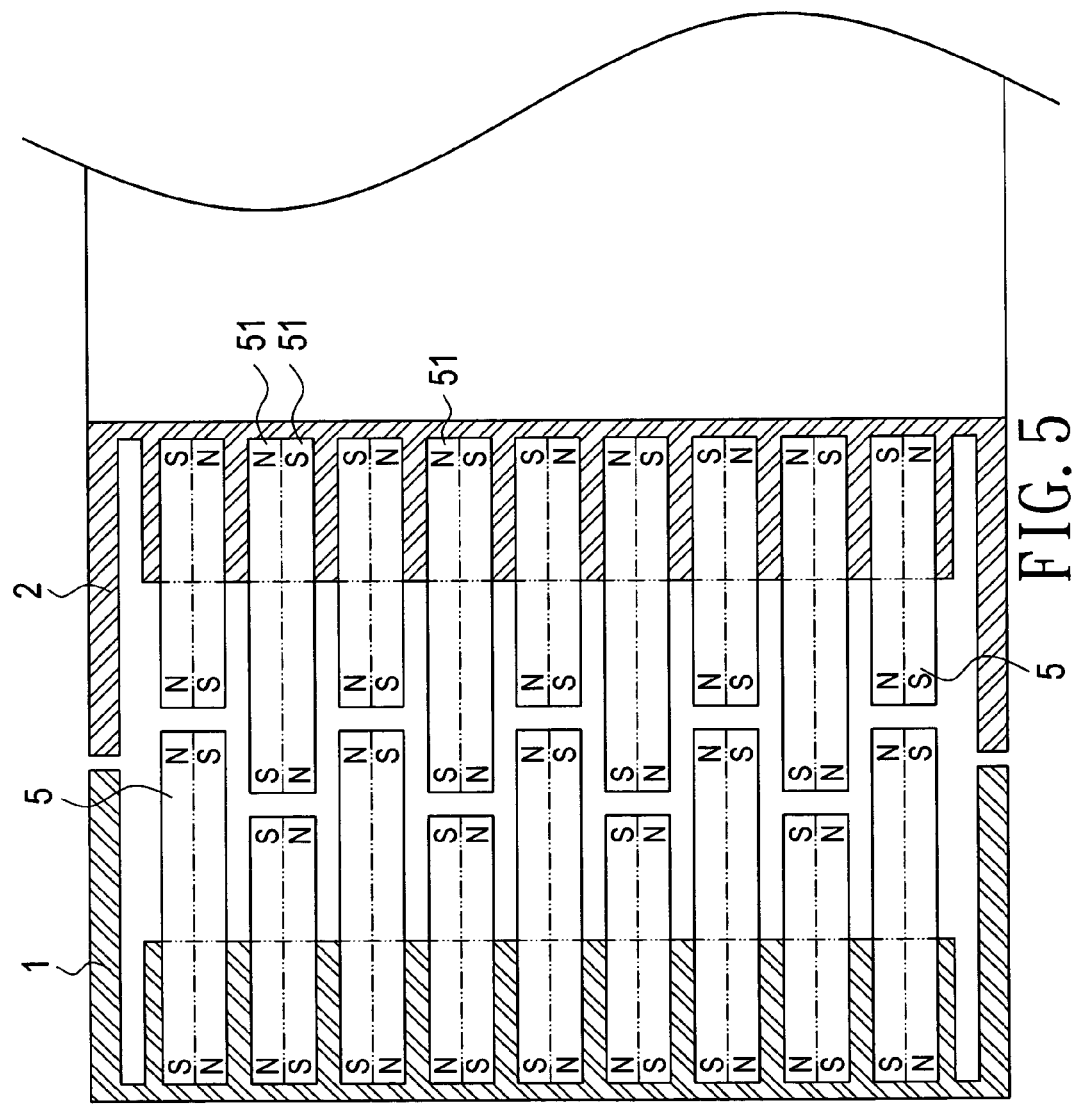
FIG. 5 is a cross sectional view in another embodiment of the present invention.

The cross sectional view of another embodiment of the present invention is shown in FIG. 5, in this embodiment, two magnets 5 in both inner and outer enclosures can be arrayed in pair with their different pole tips 51 facing against each other, wherein the outer enclosure is magnetically conductive.

The cross sectional view of one more embodiment of the present invention is shown in FIG. 5A, in this embodiment, two magnet 5 in both inner and outer enclosures can be arrayed in pair with their different pole tips 51 facing against each other, wherein the inner enclosure is magnetically conductive.

In all, the magnetic suspension bearing disclosed by the present invention has several noteworthy advantages compared with any conventional pivot or ball bearing, namely:

1. The magnetic suspension bearing does not generate heat or produce powdered metallic dust during operation as that the mechanical pivot or ball bearing does. Accordingly, the working efficiency of the former is much better than the latter, and the lifetime of the magnetic suspension bearing is far longer than that of the pivot or ball bearing.

2. The upper and lower gaps formed between coupled inner and outer enclosures prevent mutual collision of the magnets due to vibration when the shaft rotates with a heavy load.

3. Both inner and outer lids are made of magnetic shielding material which contribute to isolating the structure from magnetization so as to prolong the lifetime of the shaft and bearing and other parts.

It is understood that the present invention is a high level technical creation and by no means, simply utilizes conventional technology or knowledge known prior to the application for patent or can easily be made by persons skilled in the arts. Prior the application for patent, the invention has neither been published or put to public use nor displayed in an exhibition therefore the present invention is entitled for a patent.

Many changes and modifications in the above described embodiments of the invention can, of course be carried out without departing from the scope thereof. Accordingly, to promote the progress in science and useful arts, the invention is disclosed and is intended to be limited only by the scope of the appended claims.

What is claimed is:

1. A magnetic suspension bearing comprising:

an outer enclosure made of a magnetic conducting material, enclosing a plurality of magnets, wherein each magnet has a pole mounted in the outer enclosure and another pole emerged out of the outer enclosure;

an inner enclosure made of a magnetic conducting material, enclosing a plurality of magnets, wherein each magnet has a pole mounted in the outer enclosure and another pole emerged out of the outer enclosure;

an outer lid made of a magnetic shielding material, provided on one side of said outer enclosure for covering said outer enclosure to isolate the magnetism of the magnets; and an inner lid made of a magnetic shielding material, provided on one side of said inner enclosure for covering said inner enclosure to isolate the magnetism of the magnets, wherein the magnets of the outer and the inner enclosures are corresponding to each other to form a plurality of pairs of magnets enclosed therein, each magnet pair has two emerged poles with same magnetism facing to each other;

wherein said magnets in said inner enclosure and said magnets in said outer enclosure are stacked up and down staggeringly with a gap remained between each facing magnet pair so that when an upper magnet pair has the magnet in the inner enclosure emerging longer than that in the outer enclosure, vice versa for an lower met pair.

2. The magnetic suspension bearing of claim 1, wherein said inner and said outer encloses are coupled together remaining an upper gap and a lower gap between a contacting boundary of said two enclosures.

3. The magnetic suspension bearing of claim 2, wherein the size of said gaps formed on the contact boundary of said two enclosures are smaller than said gaps remained between each facing pair of magnets.

* * * * *